United States Patent
Qian et al.

[11] Patent Number: 5,826,748
[45] Date of Patent: Oct. 27, 1998

[54] CLOSED ISOBARIC DISPENSER FOR CARBONATED LIQUID

[76] Inventors: Zide Qian; Benyu Qian, both of 4750 E. Templeton St., Unit 1210, Los Angeles, Calif. 90032

[21] Appl. No.: 585,967

[22] Filed: Jan. 16, 1996

Related U.S. Application Data

[63] Continuation-in-part of Ser. No. 396,384, Feb. 28, 1995, abandoned.

[51] Int. Cl.$^6$ ..................................... G01F 11/28
[52] U.S. Cl. ................. 222/1; 222/192; 222/450
[58] Field of Search ............... 222/1, 192, 450, 222/425; 141/319–322, 364, 1

[56] References Cited

U.S. PATENT DOCUMENTS

| | | | |
|---|---|---|---|
| 345,112 | 7/1886 | Canan | 222/450 |
| 652,992 | 7/1900 | Arnold | 222/450 |
| 1,223,407 | 4/1917 | Scypinski | 222/450 |
| 2,356,755 | 8/1944 | Fazekas | 141/322 |
| 2,985,343 | 5/1961 | Mask | 222/450 X |
| 3,005,578 | 10/1961 | Mainieri | 222/450 |
| 3,237,816 | 3/1966 | Anderson | 222/450 |
| 4,005,807 | 2/1977 | Wiesner | 222/450 X |
| 4,105,142 | 8/1978 | Morris, Jr. | 222/450 X |
| 4,313,477 | 2/1982 | Sebalos | 141/364 X |

*Primary Examiner*—Kevin P. Shaver
*Attorney, Agent, or Firm*—David & Raymond; Raymond Y. Chan

[57] ABSTRACT

A closed isobaric dispenser for carbonated liquid which is affixed to a capped opening of a carbonated liquid containing bottle or liquid holder in airtight manner. The dispenser includes a container, a connecting adaptor and a cap opener. The interior space of the container defines an airtight closed chamber. The container has an inlet opening for the carbonated liquid flowing from the bottle or holder into the airtight closed chamber, and an outlet access for dispensing the carbonated liquid within the container. The outlet access, for dispensing of the carbonated liquid within the container, is secured with a detachable sealing means in airtight manner. The container is adapted to be firmly secured to the carbonated liquid containing bottle or holder by means of the connecting adaptor in airtight manner, wherein the cap is positioned inside the container. The cap opener is disposed coaxially with the holder cap within the airtight closed chamber and comprises a cap sleeve which is adapted to engage with the cap, so that by rotating an operating handle attached to the cap sleeve, the cap is driven to rotate simultaneously so as to unscrew the cap apart from the holder. Since the dispensation or consumption of carbonated liquid is carried out in the airtight closed chamber, carbon dioxide content in the carbonated liquid may not escape to the surrounding atmosphere. Thus the compressed carbon dioxide can be virtually preserved regardless the number of times of dispensation.

22 Claims, 3 Drawing Sheets

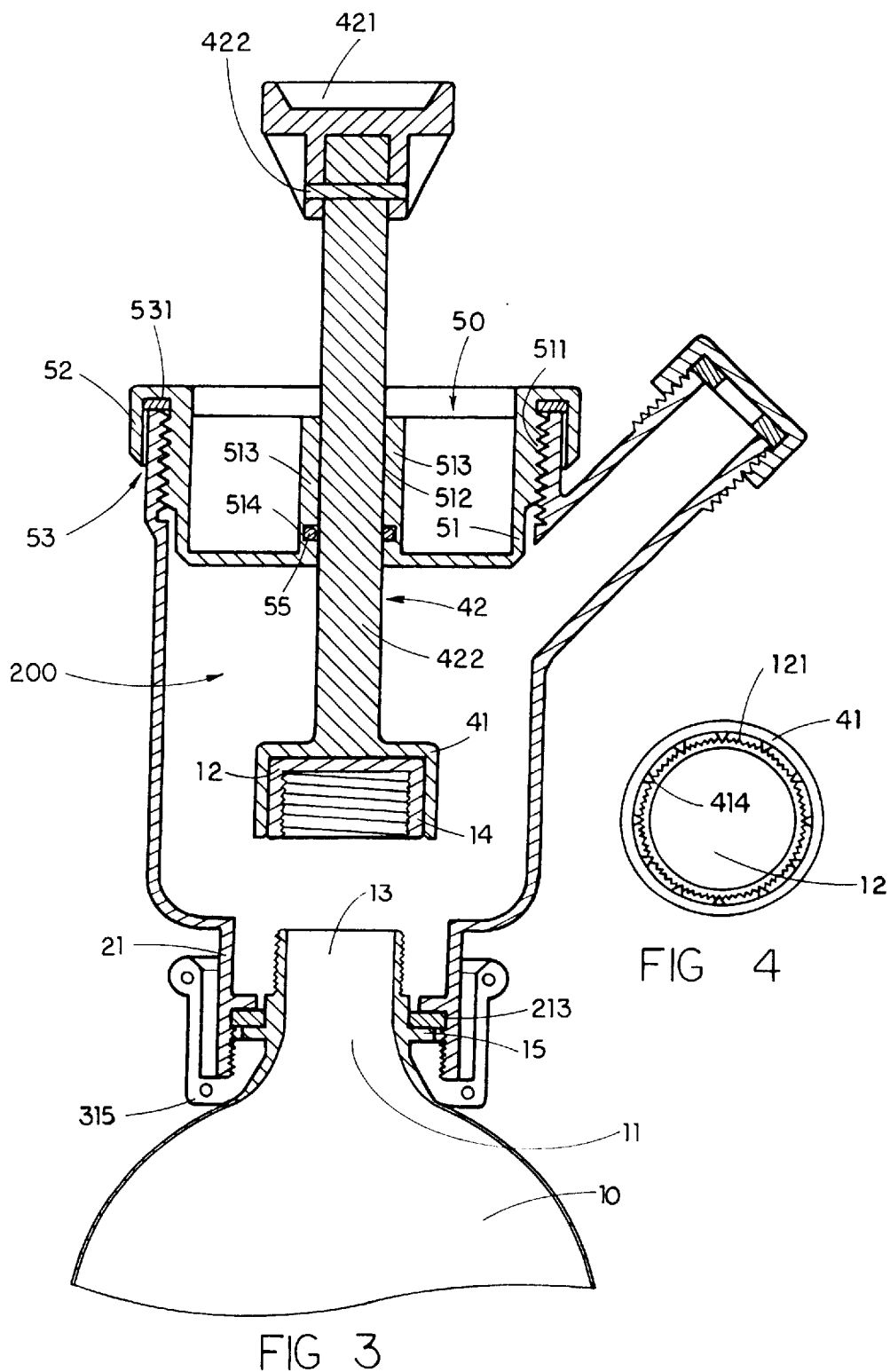

CLOSED ISOBARIC DISPENSER FOR CARBONATED LIQUID

BACKGROUND OF THE INVENTION

This application is a continuation-in-part of an original application, Ser. No. 08/396,384, filed Feb. 28, 1995, now abandoned. This application relates to liquid dispenser, and more particularly to a closed isobaric dispenser for carbonated liquid which is adapted to associate with a carbonated liquid container. The present invention is useful for dispensing the carbonated liquid from a bottle or other similar container and preserving the carbon dioxide content in the carbonated liquid from leakage or escaping to the surrounding atmosphere during consumption.

Various kinds of carbonated liquid, such as "COCA-COLA" and "7-UP", are the most common and popular beverages nowadays. The compressed carbon dioxide in carbonated beverage provides a familiar feeling to thirsty consumers. Carbonated beverage is generally on sale in containers such as airtight cans or bottles packaged for the preservation of compressed carbon dioxide.

The most popular capacities of the bottled carbonated beverage are one liter, two liters and even three liters. It is because the large capacity of the bottle package is relatively cheaper in price and beneficial to environmental protection. Most family and company consumers purchase the bottled carbonated beverage and store such in a refrigerator. However, all the current containers of the carbonated beverage bear serious shortcomings described hereafter.

The carbonated beverage containers, cans or bottles, are airtight before opened. Once the consumer opens the airtight container, the airtight structure between the cap and the bottle is broken and the whole can or bottle of carbonated beverage is exposed to the atmosphere. Due to the atmospheric pressure, a large amount of compressed carbon dioxide will be forced to escape to the atmosphere.

For canned carbonated beverage, the consumer has to finish the whole can immediately, otherwise almost all the compressed carbon dioxide in the remaining beverage will escape to the atmosphere after a while, that the remaining beverage will become flat.

For bottled carbonated beverage having a capacity more than a liter, if the consumer cannot finish the whole bottle of carbonated beverage immediately after it is opened, no matter how tight the cap being rescrewed to the bottle, the remaining carbonated beverage will gradually lose its content of carbon dioxide due to leakage. Moreover, every time when the cap is opened again every time to pour out the beverage, a large amount of carbon dioxide may escape to the atmosphere. Therefore, the remaining beverage in the bottle may soon become flat.

To install a secondary smaller container to a large holder or container for containing fluid substance therein is a known art. Various dispensing devices have been disclosed in numerous of U.S. patents, including Sebalos's U.S. Pat. No. 4,313,477, Morris, Jr's U.S. Pat. No. 4,105,142, Wiesner's U.S. Pat. No. 4,005,807, Fazeka's's U.S. Pat. No. 2,356,755, Mask's U.S. Pat. No. 2,985,343, Scypinski's U.S. Pat. No. 1,223,207, and Arnold's U.S. Pat. No. 652,992. However, none of them is designed to adapt for carbonated liquid dispensation. In accordance with the above prior arts, none of the devices includes any specified configuration or feature for preserving carbon dioxide content in carbonated liquid. Moreover, the installation of dispensing devices known in art to a bottle or similar container must be carried out after it is opened. The closed isobaric dispenser of the present invention can be installed to a carbonated liquid bottle before it is unseal to open. Furthermore, the user can unlock and relock the airtight cap of the bottle within an airtight chamber provided by the dispenser of the present invention, so as to prevent any leakage of compressed carbon dioxide to the surrounding atmosphere. However no patent nor other prior art has been located and shown the combination of purposes and advantages of the present invention.

SUMMARY OF THE INVENTION

The main object of the present invention is to provide a closed isobaric dispenser for carbonated liquid, which defines an airtight closed chamber affixed to a holder head of an unopened airtight bottle or holder of carbonated liquid in airtight manner, so as to enable the user to unlock the holder cap within the airtight closed chamber and fill the airtight closed chamber with the carbonated liquid. The airtight closed chamber provides an isobaric environment, so that the compressed carbon dioxide in the carbonated liquid can be prevented from escaping or leaking to the surrounding atmosphere.

Another object of the present invention is to provide a closed isobaric dispenser for carbonated liquid, wherein the user can relock the holder cap to the holder head opening within the airtight closed chamber before consuming the carbonated liquid therein. Since the dispensation of the carbonated liquid is carried out in the airtight closed chamber, the carbon dioxide can be preserved from escaping to the surrounding atmosphere. It is fundamental to the preservation of carbonation since the amount of carbon dioxide kept within the carbonated liquid is determined by the partial pressure of the carbon dioxide in the space right above the carbonated liquid in the bottle or holder. Thus the present invention can conserve the compressed carbon dioxide content of the carbonated liquid during consumption. Moreover, the number of times of dispensation has virtually no effect on the preservation of carbonation.

Another object of the present invention is to provide a closed isobaric dispenser for carbonated liquid, in which the dispensation is under the same pressure between the bottle (or holder) and the airtight closed chamber, hence there are no ejection and no vigorous foaming during the dispensing process, so that the carbon dioxide content within the carbonated liquid can be preserved.

Another object of the present invention is to provide a closed isobaric dispenser for carbonated liquid, in which the amount of carbonated liquid dispensed arbitrarily depends upon the capacity of the airtight chamber. Hence the carbonated liquid can be consumed in a very economic way while the carbonation of the carbonated liquid is well preserved.

Accordingly, the present invention provides a closed isobaric dispenser for carbonated liquid, which is affixable to a capped opening of a carbonated liquid containing bottle or holder in airtight manner. The closed isobaric dispenser comprises a container, a connecting adaptor and a cap opener. An interior space of the container forms an airtight closed chamber. The container has an inlet opening for the carbonated liquid flowing from the bottle or holder into the airtight closed chamber, and an outlet access for dispensing the carbonated liquid within the container.

The outlet access is secured with a detachable sealing means in airtight manner. The detachable sealing means is adapted for equipping with the outlet access to constantly close and to selectively open the outlet access to allow the dispensation of the carbonated liquid within the container. The container is adapted to be firmly secured to the carbonated liquid containing bottle or holder by means of the connecting adaptor in airtight manner, wherein a cap of the bottle or holder is positioned inside the container and the inlet opening of the container can be operated to provide a flowing path of liquid flow communication with the holder opening.

The cap opener, which is disposed coaxially with the cap within the airtight closed chamber, and comprises a cap sleeve and an operating handle coaxially connected to the cap sleeve. The cap sleeve is adapted to engage with the cap, so that by rotating the operating handle, the cap sleeve drives the cap to rotate simultaneously so as to unscrew the cap apart from the holder opening to enable the carbonated liquid flowing from the holder into the container, i.e. the airtight closed chamber.

When predetermined volume of carbonated liquid is poured out from the holder to fill the airtight closed chamber, the cap can be firmly resecured to the holder opening by means of the cap opener. Then the carbonated liquid within the closed chamber can be dispensed via the outlet access by removing the sealing means. Since the dispensation or consumption of the carbonated liquid is carried out in the airtight closed chamber, carbon dioxide content in the carbonated liquid may not escape to the surrounding atmosphere and thus the compressed, carbon dioxide can be virtually preserved regardless the number of times of dispensation.

BRIEF DESCRIPTION OF DRAWINGS

FIG. 3 is a sectional view of the closed isobaric dispenser installed to a carbonated liquid bottle, with the cap of the bottle opened within the airtight chamber, according to the above embodiment of the present invention.

FIG. 4 is a bottom view of the cap sleeve of the cap opener which is engaged with the bottle cap according to the above embodiment of the present invention.

DETAILED DESCRIPTION OF THE INVENTION

Figure 1:
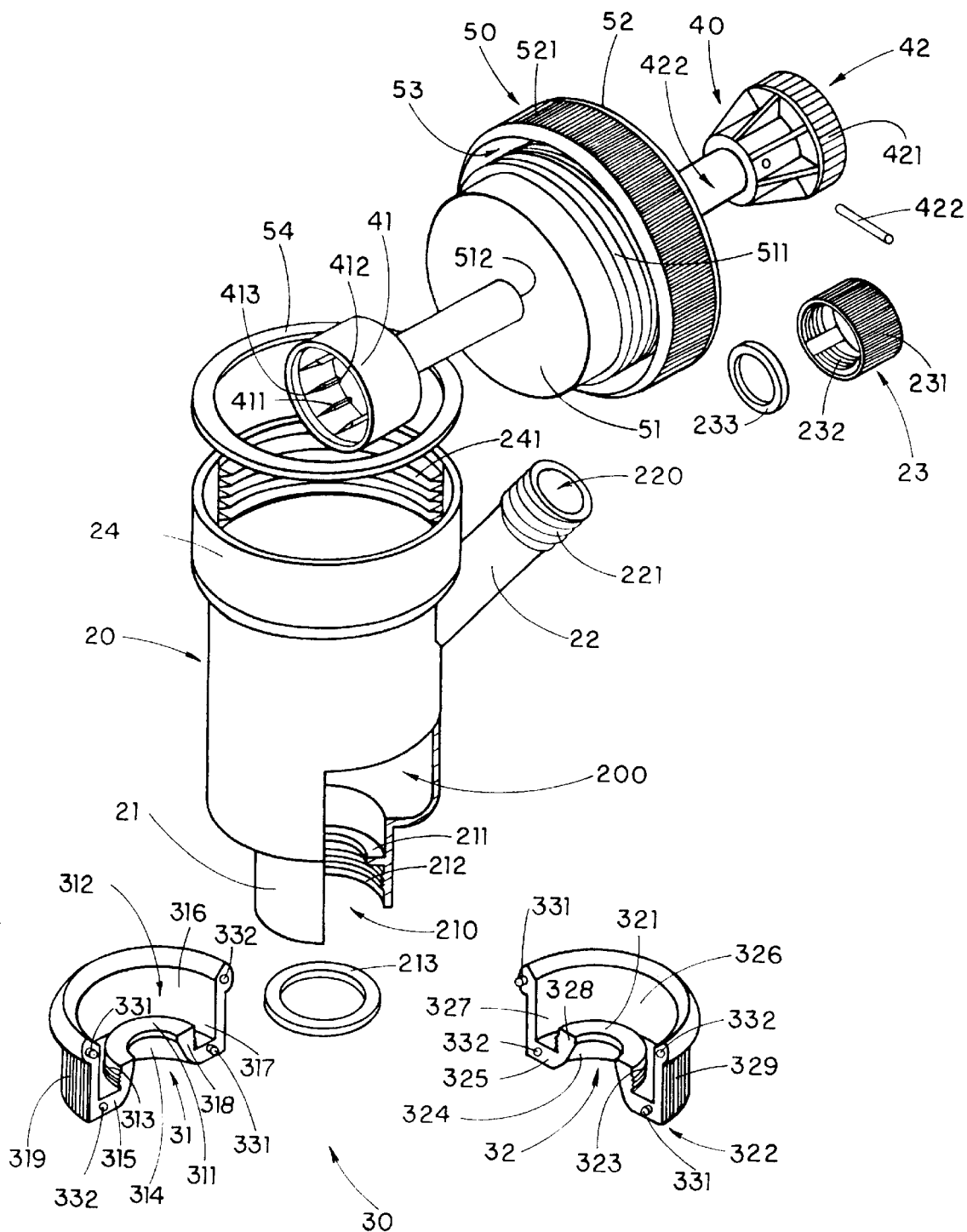
FIG. 1 is an exploded perspective view of a closed isobaric dispenser according to a preferred embodiment of the present invention.
Figure 2:
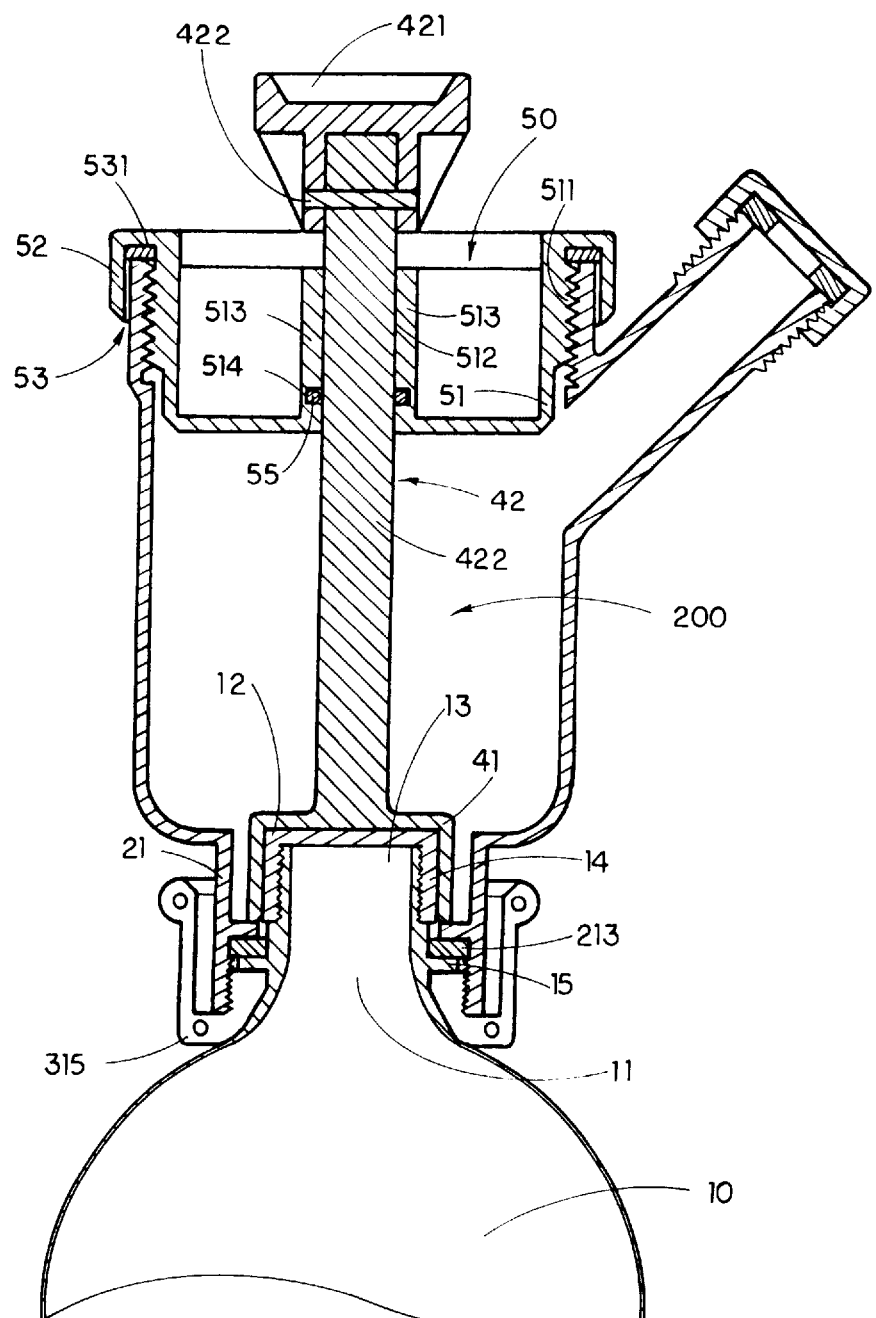
FIG. 2 is a sectional view of the closed isobaric dispenser installed to a carbonated liquid bottle according to the above preferred embodiment of the present invention.

Referring to FIGS. 1 to 3, a closed isobaric dispenser for carbonated liquid of the present invention is associated with a carbonated liquid containing bottle or holder 10 which has a holder head 11 and a cap 12 with inner thread. The holder head 11 generally has a holder opening 13 with outer thread 14 for securing with the cap 12 to close the holder opening 13, and a periphery rim 15 radically protruded below the outer thread 14.

The closed isobaric dispenser comprises a container 20, a connecting adaptor 30 and a cap opener 40. The container 20 is affixed to the capped holder opening 13 of the carbonated liquid containing holder 10, in airtight manner, by device of the connecting adaptor 30. The cap 12 is positioned inside the container, as shown in FIG. 2. The container 20 is a cylindrical hollow case which has a narrowed end to form a connecting sleeve 21. The interior space of the container is then forming an airtight closed chamber 200. The connecting sleeve 21 forms an inlet opening 210 which is adapted to be operated to provide a flowing path of liquid flow communication with the holder opening 13, so that the carbonated liquid can be flown from the bottle 10 into the airtight closed chamber 200 of the container 20. The connecting sleeve 21 further provides an inner periphery shoulder 211 protruded inwardly and radically from an inner surface of the connecting sleeve 21. Between the periphery shoulder 211 and a free end of the connecting sleeve 21, an inner sleeve thread surface 212 is formed. A gasket 213 is adhesively attached underneath the shoulder 211.

The container 20 further comprises a hollow outlet tube 22 inclinedly connected thereto. A free end of the outlet tube 22 has an outer thread portion 221 and forms an outlet access 220 for dispensing the carbonated liquid within airtight closed the chamber 200 of the container 20. The outlet access 220 is secured by a detachable sealing means 23 in airtight manner. The sealing means 23 is equipped with the outlet access 220 to constantly close and to selectively open the outlet access 220 for allowing the dispensation of the carbonated liquid within the container 20. The sealing means 23 comprises a seal cap 231 with an inner thread surface 232 and a sealing gasket 233 attached to a bottom of the seal cap 231. Thus, by screwing the seal cap 231 to the outer thread portion 221 of the outlet tube 22 until a tip edge of the outlet tube 22 pressing on the sealing gasket 233, the outlet access 220 is airtight sealed by the seal cap 231.

The other end of the container 20 enlarges its diameter to provide a connecting collar 24 which inner surface provides an inner thread portion 241 adapted to be secured with a container head in airtight manner 50. Referring to FIGS. 1 and 2, the container head 50 comprises a cylindrical cap body 51 protruding an outer threaded portion 511 and a central hole 512. The container head 50 further comprises an outer periphery circular lip 52 for rotating the cap body 51 to secure with the connecting collar 24 of the container 20 by screwing the outer threaded portion 511 of the cap body 51 to engage with the inner thread portion 241 of the connecting collar 24 of the container 20.

The outer periphery circular lip 52 of the container head 50 has a diameter larger than the diameter of a cap body 51 and is downwardly extended from the top outer edge of the cap body 51, so as to define a ring groove 53, which has a width slightly larger than the thickness of the connecting collar 24, between an inner surface of the lip 52 and an outer circular surface of the connecting collar 24 of the container 20. Therefore, a top portion of the connecting collar 24 is interposed between the lip 52 and the connecting collar 24, as shown in FIG. 2. The outer circular surface of the lip 52 is indented to form an indentation surface 521 for easy gripping while rotating the container head 50 to engage with or detach from the container 20. A bottom of the ring groove 53 forms a receiving room 531 which has a width larger than that of the groove 53. A seal gasket 54 is firmly attached to the receiving room 531. Therefore, an airtight connection can be achieved by downwardly screwing the cap body 51 of the container head 50 into the connecting collar 24 of the container 20 until the top edge of the connecting collar 24 is pressed onto the seal gasket 54.

The cap body 50 has U-shaped cross section and a bottom surface providing a circular hollow stem 513 for elongating the central hole 512 for coaxially holding the cap opener 40 in position. An inner tubral surface of the stem 513 has an O-ring groove 514 for receiving a sealing O-ring 55 in position.

The cap opener 40 which is disposed coaxially with the holder cap 12 within the airtight closed chamber 200, comprises a cap sleeve 41 and an operating handle 42 coaxially connected to the cap sleeve 41.

The operating handle 42 comprises an operating head 421 and an operating rod 422 which is penetrated through the elongated central hole 512, in airtight manner, by means of the O-ring 55. One end of the operating rod 422 is integrally and coaxially connected with the cap sleeve 41 while the other end of the operating rod 422 is joined with the operating head 421 by means of an engagement latch 422.

The cap sleeve 41 is a circular ring like body having an inner diameter equal to or slightly larger than an outer diameter of the cap 12. An inner edge of a free end of the cap sleeve 41 forms a guiding inclined edge for guiding the cap sleeve 41 onto the cap 12 coaxially. A plurality of linear driving crests 411 are inwardly protruded from an inner circular surface of the cap sleeve 41, The driving crests 411 are parallelly and evenly spaced with each other. Each of the driving crests 411 has a jutting base portion 412 for engaging with the corresponding linear indentations 121 formed on the outer circular surface of the cap 12 of the holder 10, and an inclined slopping end portion 413 for enabling easy sliding between the cap indentations 121. Furthermore, each driving crest 411 defines a longitudinal sharp crest 414 so as to form a triangular cross section, as shown in FIG. 4. Thus, the driving crests 411 is capable of longitudinally sliding and pressing between the corresponding linear indentations 121 so as to provide frictional holding force for engaging the cap sleeve 41 with the holder cap 12.

Referring to FIG. 1, the connecting adaptor 30 is adapted to mount the container 20 upon the holder head 11 in air tight manner, which comprises two identical and symmetrical half units 31, 32 coupled with each other to form a cup like body. Each of the two units 31, 32 comprises a semi-circular connector 311, 321 having a height shorter than the height between the bottom end and the shoulder 211 of the connecting sleeve 21. Each of the units 31, 32 further comprises a driver means 312, 322 attached to the connector 311, 321 for the operator to hand hold and rotate. An outer periphery of each connector 311, 321 of each unit 31, 32 forms a half portion of securing thread 313, 323. When the two units 31, 32 are connected face to face to form a cylindrical body, the two half threaded portions 313, 323 are coincided with each other to form a complete circular thread surface adapted for meshing with the inner sleeve thread surface 212. An inner periphery of each connector 311, 321 forms a curve concavity 314, 324 with a smaller upper radius adapted to abut upon an exterior curve surface of the holder head 11 for ensuring proximate mounting thereon.

Each of the driver means 312, 322 of the two units 31, 32 comprises a base portion 315, 325, which is extended radically and outwardly from a bottom of the connector 311, 321, and a vertical driving wall 316, 326, which has a height higher than the connector 311, extended upwardly from an end of the base portion 315. Therefore, a vertical receiving semi-circular groove 317, 327 is defined between the connector 315, 325 and the driving wall 316, 326, which has a width larger than the thickness of the connecting sleeve 21 of the container 20, as shown in FIGS. 2 and 3. Each end of the connectors 311, 321 and the driver means 312, 322 integrally defines a flat coupling surface 318, 328. Each outside periphery of each driving wall 316, 326 of each unit 31, 32 provides a longitudinal indentation surface 319, 329 for easy gripping.

The connecting adaptor 30 further comprises a joint means 33 for holding the two units 31, 32 to prevent longitudinal displacement therebetween. According to the present embodiment, the joint means 33 comprises a plurality of plugs 331 and sockets 332 integrally formed at predetermined and correlated positions of the flat coupling surfaces 318, 328 of the units 31, 32. Since the units 31, 32 are symmetrically configured, each plug 331 protruded on each unit 31, 32 is confronted with a respective socket 332 indented on the other unit 31, 32, so that when the two units 31, 32 are coupled with each other to form a cup like body, the plugs 331 are inserted into the respective sockets 332.

Before unlocking the airtight bottle cap 12 of a carbonated liquid containing bottle 10, the two units 31, 32 of the connecting adaptor 30 are mounted to the holder head 11 by coupling with each other. Thus the connecting adaptor 30 is fully installed. In this instance, the container 20 is able to secure with the connecting adaptor 30 by screwing the connecting sleeve 21 to the complete circular thread surface formed by the two half portions of securing thread 313, 323 until the rim 15 of the holder head 11 of the holder 10 urging against the gasket 213 attached to the shoulder 211 of the container 20. Such that the holder 10 and the container 20 are easily and firmly connected together in airtight manner by means of the connecting adaptor 30.

In accordance with the configuration disclosed above, to unlock the cap 12, the operator can first simply push the cap opener 40 downward until its cap sleeve 41 is engaged with the cap 12. Since the cap sleeve 41 is adapted to firmly engage with the cap 12 due to its sloping driving crests 411, by rotating the operating handle, the inner driving crests 411 of the cap sleeve 41 which are engaged with the outer indentations 121 of the cap 12, can drive the cap 12 to rotate simultaneously to unscrew the cap 12. In this instance, the holding force between the cap 12 and the holder head 11 is released. Then, the cap opener 40 can be pulled upwardly to lift the cap 12, which is engaged within the cap sleeve 41, until it is detached apart from the holder opening 13. Thus, the carbonated liquid in the holder 10 is able to pour into the airtight closed chamber 200 via its opening 13. When predetermined volume of carbonated liquid is poured out to fill the airtight closed chamber 200, the cap 12 can be downwardly pushed down to the opening 13 by pushing the cap opener 40 and firmly resecured to the opening 13 by rotating the cap opener 40. Afterward, the carbonated liquid within the closed chamber 200 can be dispensed via the outlet opening 22 by releasing the sealing means 23. Since the dispensation or consumption of carbonated liquid is carried out in the airtight closed chamber 200, carbon dioxide may not escape to the surrounding atmosphere. Therefore, the compressed carbon dioxide can be virtually preserved regardless the number of times of dispensation.

Defining alternatively, the present invention is a method of dispensing carbonated liquid and preserving its compressed carbon dioxide content, the method comprising the steps of: (a) mounting a closed isobaric dispenser onto a holder opening, which is secured with a cap in an airtight manner, of a carbonated liquid containing holder, in which the dispenser has a cap opener, a sealed outlet access and an airtight closed chamber that the holder cap is positioned therein; (b) unlocking and removing the cap to open the holder opening by means of the cap opener within the airtight closed chamber of the dispenser; (c) pouring the carbonated liquid in the holder to the airtight closed chamber; (d) locking the cap of the holder to the holder opening by means of the cap opener within the airtight closed chamber: (e) unsealing the outlet access and dispensing the carbonated liquid in the airtight closed chamber through the outlet access; and (f) resealing the outlet access.

The following advantages can be achieved according to the present invention:

(1) The airtight locking between the cap 12 and the holder opening 13 of the carbonated liquid containing bottle or holder 10 will be broken after the first unlocking of the cap that the compressed carbon dioxide in the holder 10 may start to escape to the surrounding atmosphere during consumption. According to the present invention, a closed isobaric dispenser for carbonated liquid which defines an airtight closed chamber is affixed to the holder head of an unopened airtight holder of carbonated liquid in airtight manner, so that the user can unlock the cap within the airtight closed chamber and fill the airtight closed chamber with the carbonated liquid. The airtight closed chamber provides an isobaric environment, so that the compressed carbon dioxide of the carbonated liquid can be prevented from escaping or leaking to the surrounding atmosphere.

(2) The user can relock the cap to the holder head opening within the airtight closed chamber before consuming the carbonated liquid therein. Since the dispensation of the carbonated liquid is carried out in the airtight closed chamber, the carbon dioxide can be preserved from escaping to the surrounding atmosphere. It is fundamental to the preservation of carbonation since the amount of carbon dioxide kept within the carbonated liquid is determined by the partial pressure of the carbon dioxide in the space right above the carbonated liquid in the bottle or holder. Thus the present invention can conserve the compressed carbon dioxide content of the carbonated liquid during consumption. Moreover, the number of times of dispensation has virtually no effect on the preservation of carbonation.

(3) The dispensation is under the same pressure between the bottle or holder and the airtight closed chamber. There are no ejection and no vigorous foaming during the dispensing process, so that the carbon dioxide content within the carbonated liquid can be kept in there.

(4) The amount of carbonated liquid dispensed arbitrarily depends upon the capacity of the airtight chamber. Hence the carbonated liquid can be consumed in a very economic way while the carbonation of the carbonated liquid is well preserved.

We claim:

1. A method of dispensing carbonated liquid and preserving the compressed carbon dioxide content thereof, which comprises the steps of:

(a) mounting a closed isobaric dispenser onto a holder opening, which is secured with a cap in airtight manner, of a carbonated liquid containing holder, in which said dispenser has a cap opener, a sealed outlet access and an airtight closed chamber that said cap is positioned therein;

(b) unlocking and removing said cap to open said holder opening by means of said cap opener within said airtight closed chamber of said dispenser;

(c) pouring said carbonated liquid in said carbonated liquid containing holder to said airtight closed chamber;

(d) resecuring said cap of said carbonated liquid containing holder to said holder opening by means of said cap opener within said airtight closed chamber;

(e) unsealing said outlet access and dispensing said carbonated liquid in said airtight closed chamber through said outlet access; and (f) resealing said outlet access of said airtight closed chamber of said dispenser.

2. A method of dispensing carbonated liquid and preserving the compressed carbon dioxide content thereof, as recited in claim 1, in which said closed isobaric dispenser for carbonated liquid comprises:

a container, which defines said airtight closed chamber therein, having an inlet opening for enabling said carbonated liquid to flow from said carbonated liquid containing holder into said airtight closed chamber, and said outlet access being formed on said container for dispensing said carbonated liquid within said container;

a sealing means, which is secured with said outlet access in airtight manner, for constantly closing said outlet access; and a connecting adaptor for firmly securing said container to said carbonated liquid containing holder in airtight manner, wherein said cap of said carbonated liquid containing holder is positioned inside said container and said inlet opening of said container provides a flowing path of liquid flow communication with said opening of said carbonated liquid containing holder; wherein said cap opener, which is disposed coaxially with said cap of said carbonated liquid containing holder within said airtight closed chamber, comprising a cap sleeve and an operating handle coaxially connected to said cap sleeve, in which said cap sleeve is adapted to be engaged with said cap of said carbonated liquid containing holder so as to drive said cap to rotate simultaneously for unscrewing said cap apart from said carbonated liquid containing holder into said airtight closed chamber of said container, whereby after a predetermined volume of said carbonated liquid is poured out from said carbonated liquid containing holder to fill said airtight closed chamber, said cap is firmly resecured to said opening of said carbonated liquid containing holder by means of said cap opener, and that said carbonated liquid within said closed chamber is capable of dispensing via said outlet access by removing said sealing means.

3. A closed isobaric dispenser for carbonated liquid which is affixed to a holder head, which has an opening capped by a cap, of a carbonated liquid containing holder, comprising:

a container, which defines an airtight closed chamber therein, having an inlet opening for enabling a carbonated liquid to flow from said carbonated liquid containing holder into said airtight closed chamber, and an outlet access for dispensing said carbonated liquid within said container;

a sealing means, which is secured with said outlet access in airtight manner, for constantly closing said outlet access;

a connecting adaptor for firmly securing said container to said carbonated liquid containing holder in airtight manner, wherein said cap of said carbonated liquid containing holder is positioned inside said container and said inlet opening of said container provides a flowing path of liquid flow communication with said opening of said carbonated liquid containing holder; and a cap opener, which is disposed coaxially with said cap of said carbonated liquid containing holder within said airtight closed chamber, comprising a cap sleeve and an operating handle coaxially connected to said cap sleeve, in which said cap sleeve is adapted to be engaged with said cap of said carbonated liquid containing holder so as to drive said cap to rotate simultaneously for unscrewing said cap apart from said carbonated liquid containing holder into said airtight closed chamber of said container, whereby after a predetermined volume of said carbonated liquid is poured out from said carbonated liquid containing holder to fill said airtight closed chamber, said cap is firmly resecured to said opener of said carbonated liquid containing holder by means of said cap opening, and that said carbonated liquid within said closed chamber is capable of dispensing via said outlet access by removing said sealing means.

4. A closed isobaric dispenser of carbonated liquid, as recited in claim 3, in which said container is a hollow case which one end forms a circular connecting sleeve and defines said inlet opening, said connecting sleeve having an inner periphery shoulder protruded inwardly and radially from an inner surface thereof and an inner sleeve thread surface between said periphery shoulder and a free end of said connecting sleeve for securing with said connecting adaptor, said container further comprising a gasket attached underneath said shoulder.

5. A closed isobaric dispenser of carbonated liquid, as recited in claim 4, in which said connecting adaptor comprises two identical and symmetrical half units which are coupled with each other to form a cup like body, wherein each of said two units comprises a semi-circular connector, which has a height shorter than a height between a bottom end and said shoulder of said connecting sleeve, and a driver means attached to each said connector for hand holding and rotating, an outer periphery of each said connector of said unit providing a half portion of a securing thread and an inner periphery of each connector providing a curve concavity adapted to abut upon an exterior surface of said holder head of said carbonated liquid containing holder for ensuring proximate mounting thereon, whereby said two units are connected face to face to form a cylindrical body for mounting on said holder head of said carbonated liquid containing holder, and that said two half threaded portions are coincided with each other to form a complete circular thread surface adapted for meshing with said inner sleeve thread surface, so that said container is connected to said holder head of said carbonated liquid containing holder with said capped opening positioned within said container until a periphery rim, which is protruded outwardly and radically on said holder head, urging against said gasket.

6. A closed isobaric dispenser of carbonated liquid, as recited in claim 5, in which said connecting adaptor further comprises a joint means for holding said two units to prevent longitudinal displacement therebetween.

7. A closed isobaric dispenser of carbonated liquid, as recited in claim 6, in which each end of said connectors and said driver means integrally defines a flat coupling surface, said joint means comprising a plurality of plugs and sockets integrally formed at predetermined and correlated positions of said flat coupling surfaces of said units, wherein each said plug protruded on one of said units is confronted with a respective socket indented on said other unit, so that said two units are coupled with each other to form a cup like body by inserting said plugs into said respective sockets respectively.

8. A closed isobaric dispenser of carbonated liquid, as recited in claim 7, in which an outside periphery of said driving means of each said unit provides a longitudinal indentation surface for easy gripping.

9. A closed isobaric dispenser of carbonated liquid, as recited in claim 7, in which each said driver means of each said unit comprises a base portion extended radially and outwardly from a bottom of said connector and a vertical driving wall, having a height higher than said connector, extended upwardly from an end of said base portion, so that a vertical receiving semi-circular groove which has a width larger than a thickness of said connecting sleeve of said container is defined between said connector and said driving wall.

10. A closed isobaric dispenser of carbonated liquid, as recited in claim 9, in which said cap opener comprises a cap sleeve which is a ring like body having an inner diameter at least equal to an outer diameter of said cap of said carbonated liquid containing holder, wherein said cap sleeve has a plurality of linear driving crests inwardly protruded from an inner circular surface of said cap sleeve for gripping upon an outer circular surface of said cap so as to provide a frictional holding force for engaging said cap sleeve with said cap.

11. A closed isobaric dispenser of carbonated liquid, as recited in claim 10, in which said driving crests are parallelly and evenly spaced with each other, each of said driving crests having a jutting base portion for engaging with a plurality of linear indentations which are formed on said outer circular surface of said cap of said holder, and an inclined slopping end portion for enabling easy sliding between said cap indentations, wherein each of said driving crests defines a longitudinal sharp crest so as to form a triangular cross section for longitudinally sliding and pressing between said corresponding linear cap indentations.

12. A closed isobaric dispenser of carbonated liquid, as recited in claim 10, in which said operating handle comprises an operating head and an operating rod which is penetrating through said container in airtight manner, wherein one end of said operating rod is integrally connected with said cap sleeve while the other end of said operating rod is extended out of said container and joined with said operating head.

13. A closed isobaric dispenser of carbonated liquid, as recited in claim 12, in which a second end of said container provides a connecting collar which has an inner surface providing an inner thread portion adapted to be secured in airtight manner with a container head, said container head cylindrical cap body protruding an outer threaded portion, a central hole which inner surface has a O-ring groove for receiving a sealing O-ring in position, and an outer periphery circular lip for rotating said cap body to secure with said connecting collar of said container by screwing said outer threaded portion of said cap body to engage with said inner thread portion of said connecting collar of said container, said operating rod being penetrated through said central hole and urged upon said sealing O-ring.

14. A closed isobaric dispenser of carbonated liquid, as recited in claim 13, in which the outer periphery lip of said container head, in circular shape, has a diameter larger than a diameter of said cap body and is downwardly extended from a top outer edge of said cap body, so as to define a ring groove between an inner surface of said lip and an outer circular surface of said connecting collar of said container, said ring groove having a width slightly larger than a thickness of said connecting collar, so that a top portion of said connecting collar is interposed between said lip and said connecting collar, a bottom of said ring groove forming a receiving room, which has a width larger than that of said ring groove, for retaining a seal gasket thereon.

15. A closed isobaric dispenser of carbonated liquid, as recited in claim 14, in which said container further comprises a hollow outlet tube connected thereto for defining said outlet access, a free end of said outlet tube having an outer thread portion, said sealing means comprising a seal cap with an inner thread surface and a sealing gasket attaching to a bottom of said seal cap, so that by screwing said sealing cap to said outer thread portion of said outlet tube until a tip edge of said outlet tube pressing on said sealing O-ring, said outlet access being sealed by said seal cap in airtight manner.

16. A closed isobaric dispenser of carbonated liquid, as recited in claim 3, in which said cap opener comprises a cap sleeve which is a ring like body having an inner diameter at least equal to an outer diameter of said cap of said carbonated liquid containing holder, wherein said cap sleeve has a plurality of linear driving crests inwardly protruded from an inner circular surface of said cap sleeve for gripping upon an outer circular surface of said cap so as to provide a frictional holding force for engaging said cap sleeve with said cap.

17. A closed isobaric dispenser of carbonated liquid, as recited in claim 16, in which said driving crests are parallelly and evenly spaced with each other, each of said driving crests having a jutting base portion for engaging with a plurality of linear indentations which are formed on said outer circular surface of said cap of said holder, and an inclined slopping end portion for enabling easy sliding between said cap indentations, wherein each of said driving crests defines a longitudinal sharp crest so as to form a triangular cross section for longitudinally sliding and pressing between said corresponding linear cap indentations.

18. A closed isobaric dispenser of carbonated liquid, as recited in claim 16, in which said operating handle comprises an operating head and an operating rod which is penetrating through said container in airtight manner, wherein one end of said operating rod is integrally connected with said cap sleeve while the other end of said operating rod is extended out of said container and joined with said operating head.

19. A closed isobaric dispenser of carbonated liquid, as recited in claim 18, in which a second end of said container provides a connecting collar which has an inner surface providing an inner thread portion adapted to be secured in airtight manner with a container head, said container head cylindrical cap body protruding an outer threaded portion, a central hole which inner surface has a O-ring groove for receiving a sealing O-ring in position, and an outer periphery circular lip for rotating said cap body to secure with said connecting collar of said container by screwing said outer threaded portion of said cap body to engage with said inner thread portion of said connecting collar of said container, said operating rod being penetrated through said central hole and urged upon said sealing O-ring.

20. A closed isobaric dispenser of carbonated liquid, as recited in claim 19, in which the outer periphery lip of said container head, in circular shape, has a diameter larger than a diameter of said cap body and is downwardly extended from a top outer edge of said cap body, so as to define a ring groove between an inner surface of said lip and an outer circular surface of said connecting collar of said container, said ring groove having a width slightly larger than a thickness of said connecting collar, so that a top portion of said connecting collar is interposed between said lip and said connecting collar, a bottom of said ring groove forming a receiving room, which has a width larger than that of said ring groove, for retaining a seal gasket thereon.

21. A closed isobaric dispenser of carbonated liquid, as recited in claim 20, in which said container further comprises a hollow outlet tube connected thereto for defining said outlet access, a free end of said outlet tube having an outer thread portion, said sealing means comprising a seal cap with an inner thread surface and a sealing gasket attaching to a bottom of said seal cap, so that by screwing said sealing cap to said outer thread portion of said outlet tube until a tip edge of said outlet tube pressing on said sealing O-ring, said outlet access being sealed by said seal cap in airtight manner.

22. A closed isobaric dispenser of carbonated liquid, as recited in claim 21, in which said container is a hollow case which one end forms a circular connecting sleeve and defines said inlet opening, said connecting sleeve having an inner periphery shoulder protruded inwardly and radially from an inner surface thereof and an inner sleeve thread surface between said periphery shoulder and a free end of said connecting sleeve for securing with said connecting adaptor, said container further comprising a gasket attached underneath said shoulder, said connecting adaptor comprising two identical and symmetrical half units which are coupled with each other to form a cup like body, wherein each of said two units comprises a semi-circular connector, which has a height shorter than a height between a bottom end and said shoulder of said connecting sleeve, and a driver means attached to each said connector for hand holding and rotating, an outer periphery of each said connector of said unit providing a half portion of a securing thread and an inner periphery of each connector providing a curve concavity adapted to abut upon an exterior surface of said holder head of said carbonated liquid containing holder for ensuring proximate mounting thereon, whereby said two units are connected face to face to form a cylindrical body for mounting on said holder head of said carbonated liquid containing holder, and that said two half threaded portions are coincided with each other to form a complete circular thread surface adapted for meshing with said inner sleeve thread surface, so that said container is connected to said holder head of said carbonated liquid containing holder with said capped opening positioned within said container until a periphery rim, which is protruded outwardly and radically on said holder head, urging against said gasket.

* * * * *